(12) United States Patent
Davis et al.

(10) Patent No.: US 7,107,507 B2
(45) Date of Patent: Sep. 12, 2006

(54) MAGNETORESISTIVE SOLID-STATE STORAGE DEVICE AND DATA STORAGE METHODS FOR USE THEREWITH

(75) Inventors: James Andrew Davis, Richmond, VA (US); Jonathan Jedwab, London (GB); Stephen Morley, Thornbury (GB); Kenneth Graham Paterson, Teddington (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 10/093,832

(22) Filed: Mar. 8, 2002

(65) Prior Publication Data
US 2003/0023926 A1   Jan. 30, 2003

Related U.S. Application Data

(63) Continuation-in-part of application No. 09/915,195, filed on Jul. 25, 2001.

(51) Int. Cl.
*G11C 29/00* (2006.01)
*G11C 11/00* (2006.01)
*G11C 8/00* (2006.01)
(52) U.S. Cl. .................. 714/763; 365/158; 365/230.03
(58) Field of Classification Search .................. 714/6, 714/7, 718–723, 763, 766, 768, 769, 773, 714/777, 780, 784; 365/158, 171, 173, 200, 365/201, 209
See application file for complete search history.

(56) References Cited

U.S. PATENT DOCUMENTS

| 4,069,970 | A |   | 1/1978  | Buzzard et al.    | 235/312    |
|-----------|---|---|---------|-------------------|------------|
| 4,209,846 | A |   | 6/1980  | Seppa             | 364/900    |
| 4,216,541 | A | * | 8/1980  | Clover et al.     | 714/764    |
| 4,458,349 | A | * | 7/1984  | Aichelmann et al. | 714/6      |
| 4,845,714 | A |   | 7/1989  | Zook              | 714/755    |
| 4,933,940 | A |   | 6/1990  | Walter et al.     | 371/9.1    |
| 4,939,694 | A |   | 7/1990  | Eaton et al.      | 365/200    |
| 5,233,614 | A |   | 8/1993  | Singh             | 371/21.6   |
| 5,263,030 | A |   | 11/1993 | Roker et al.      | 371/21.6   |
| 5,313,464 | A |   | 5/1994  | Reif              | 371/2.1    |
| 5,428,630 | A |   | 6/1995  | Weng et al.       | 371/40.1   |
| 5,459,742 | A |   | 10/1995 | Cassidy et al.    | 371/40.1   |
| 5,488,691 | A |   | 1/1996  | Fuoco et al.      | 395/185.05 |
| 5,502,728 | A |   | 3/1996  | Smith, III        | 395/182.03 |
| 5,504,760 | A |   | 4/1996  | Harari et al.     | 371/40.1   |
| 5,590,306 | A |   | 12/1996 | Watanabe et al.   | 395/442    |

(Continued)

FOREIGN PATENT DOCUMENTS

EP   0 494 547 A2   7/1992

(Continued)

OTHER PUBLICATIONS

Abstract of Japanese Patent No. JP 60007698, published Jan. 16, 1985, esp@cenet.com.

(Continued)

*Primary Examiner*—Guy Lamarre
*Assistant Examiner*—John J. Tabone, Jr.

(57) ABSTRACT

A magnetoresistive solid-state storage device (MRAM device) uses storage cells 16 arranged in many arrays 10 to form a macro-array 2. For fast access times and to reduce exposure to physical failures, each unit of data (e.g. a sector) is stored with a few sub-units (e.g. bytes) in each of a large plurality of the arrays 10. Advantageously, the plurality of arrays 10 are accessible in parallel substantially simultaneously, and a failure in any one array affects only a small portion of the data unit. Optionally, error correction coding (ECC) is employed to form encoded data with symbols which are stored according to preferred embodiments which further minimise exposure to physical failures.

13 Claims, 6 Drawing Sheets

U.S. PATENT DOCUMENTS

| | | | |
|---|---|---|---|
| 5,621,690 A | 4/1997 | Jungroth et al. | 365/200 |
| 5,745,673 A | 4/1998 | Di Zenzo et al. | 395/182.05 |
| 5,793,795 A | 8/1998 | Li | 375/200 |
| 5,848,076 A | 12/1998 | Yoshimura | 37/40.11 |
| 5,852,574 A | 12/1998 | Naji | 365/158 |
| 5,864,569 A | 1/1999 | Roohparvar | 371/40.18 |
| 5,887,270 A | 3/1999 | Brant et al. | 711/162 |
| 5,966,389 A | 10/1999 | Kiehl | 371/40.18 |
| 5,987,573 A | 11/1999 | Hiraka | 711/156 |
| 6,009,550 A | 12/1999 | Gosula et al. | 714/769 |
| 6,112,324 A | 8/2000 | Howe et al. | 714/763 |
| 6,166,944 A | 12/2000 | Ogino | 365/97 |
| 6,233,182 B1 | 5/2001 | Satou et al. | 365/200 |
| 6,275,965 B1 | 8/2001 | Cox et al. | 714/755 |
| 6,279,133 B1 | 8/2001 | Vafai et al. | 714/763 |
| 6,407,953 B1 | 6/2002 | Cleeves | 365/201 |
| 6,408,401 B1 | 6/2002 | Bhavsar et al. | 714/7 |
| 6,430,702 B1 | 8/2002 | Santeler et al. | 714/6 |
| 6,456,525 B1 | 9/2002 | Perner et al. | 365/171 |
| 6,477,077 B1 * | 11/2002 | Okazawa | 365/145 |
| 6,483,740 B1 | 11/2002 | Spitzer et al. | 365/158 |
| 6,545,898 B1 * | 4/2003 | Scheuerlein | 365/94 |
| 6,574,775 B1 | 6/2003 | Chouly | 714/800 |
| 6,684,353 B1 | 1/2004 | Parker et al. | 714/718 |
| 6,856,572 B1 * | 2/2005 | Scheuerlein et al. | 365/230.06 |
| 6,990,622 B1 | 1/2006 | Davis et al. | 714/763 |
| 2002/0029341 A1 | 3/2002 | Juels et al. | 713/184 |
| 2003/0023911 A1 | 1/2003 | Davis et al. | 714/723 |
| 2003/0023922 A1 | 1/2003 | Davis et al. | 714/763 |
| 2003/0023923 A1 | 1/2003 | Davis et al. | 714/763 |
| 2003/0023924 A1 | 1/2003 | Davis et al. | 714/763 |
| 2003/0023925 A1 | 1/2003 | Davis et al. | 714/763 |
| 2003/0023927 A1 | 1/2003 | Jedwab et al. | 714/763 |
| 2003/0023928 A1 | 1/2003 | Jedwab et al. | 714/763 |
| 2003/0156469 A1 * | 8/2003 | Viehmann et al. | 365/200 |
| 2003/0172329 A1 | 9/2003 | Davis et al. | 714/710 |
| 2003/0172339 A1 | 9/2003 | Davis et al. | 714/763 |

FOREIGN PATENT DOCUMENTS

| | | |
|---|---|---|
| EP | 0 918 334 A2 | 5/1999 |
| EP | 1 132 924 A2 | 9/2001 |
| JP | 03-244218 | 10/1991 |
| JP | 10/261043 | 9/1998 |

OTHER PUBLICATIONS

Peterson, W.W. and E.J. Weldon, Jr., *Error-Correcting Codes*, Second Edition, MIT Press, Ch. 1-3, 8 and 9 (1994).

*Reed-Solomon Codes and Their Applications*, S.B. Wicker and V. K. Bhargava, ed., IEEE Press, New York, Ch. 1, 2, 4 and 12 (1994).

Katayama, et al., "One-Shot Reed-Solomon Decoding for High-Performance Dependable Systems", *Proceedings International Conference on Dependable Systems and Networks 2000, DSN 2000*, pp. 390-399, Jun. 25-28, 2000.

* cited by examiner

MAGNETORESISTIVE SOLID-STATE STORAGE DEVICE AND DATA STORAGE METHODS FOR USE THEREWITH

This is a continuation-in-part (CIP) of U.S. patent application Ser. No. 09/915,195, filed on Jul. 25, 2001, which is incorporated herein by reference.

CROSS REFERENCE TO RELATED APPLICATION

This application is related to the pending U.S. patent application Ser. No. 09/440,323 filed on Nov. 15, 1999.

The present invention relates in general to the field of magnetoresistive solid-state storage devices and to a method for storing data in such a device. In particular, but not exclusively, the invention relates to a magnetoresistive solid-state storage device employing error correction coding (ECC), and to data storage arrangements which improve effective use of such error correction coding.

A typical solid-state storage device comprises one or more arrays of storage cells for storing data. Existing semiconductor technologies provide volatile solid-state storage devices suitable for relatively short term storage of data, such as dynamic random access memory (DRAM), or devices for relatively longer term storage of data such as static random access memory (SRAM) or non-volatile flash and EEPROM devices. However, many other technologies are known or are being developed.

Recently, a magnetoresistive storage device has been developed as a new type of non-volatile solid-state storage device (see, for example, EP-A-0918334 Hewlett-Packard). The magnetoresistive solid-state storage device is also known as magnetic random access memory (MRAM) device. MRAM devices have relatively low power consumption and relatively fast access times, particularly for data write operations, which renders MRAM devices ideally suitable for both short term and long term storage applications.

A first problem arises in that a simple crosspoint array of magnetoresistive storage cells in an MRAM device has a limited maximum size beyond which the array is not convenient to manufacture or to control in use, and in turn this limits the overall data storage capacity of the device. In response, it has been found possible to provide a plurality of arrays within a single MRAM device, in order to increase the overall data storage capacity of the device. However, it is then desired to store data in the plurality of arrays in a manner which allows fast access, such as during write or read operations.

A second problem arises in that MRAM devices are subject to physical failure, which can result in an unacceptable loss of stored data. Currently available manufacturing techniques for MRAM devices are subject to limitations and as a result manufacturing yields of commercially acceptable MRAM devices are relatively low. Although better manufacturing techniques are being developed, these tend to increase manufacturing complexity and cost. Hence, it is desired to apply lower cost manufacturing techniques whilst increasing device yield. Further, it is desired to increase cell density formed on a substrate such as silicon, but as the density increases manufacturing tolerances become increasingly difficult to control, again leading to higher failure rates and lower device yields. Since the MRAM devices are at a relatively early stage in development, it is desired to allow large scale manufacturing of commercially acceptable devices, whilst tolerating the limitations of current manufacturing techniques.

An aim of the present invention is to provide a magnetoresistive solid-state storage device comprising a plurality of arrays, wherein data is stored in the device to provide advantageous access times, particularly for write or read operations. Another aim is to provide a method for storing data such that a magnetoresistive solid-state storage device is tolerant of at least some failures. A preferred aim is to provide a magnetroresistive solid-state storage device and method for storing data in the device, which improves device access times and which also improves tolerance of failures.

According to a first aspect of the present invention there is provided a method for storing data in a magnetoresistive solid-state storage device having magnetoresistive storage cells arranged in more than one array, the method comprising the steps of: selecting a plurality of arrays from amongst the more than one arrays; selecting one or more storage cells within each of the plurality of arrays; and accessing substantially simultaneously the selected cells within the selected plurality of arrays.

Preferably, the magnetoresistive storage cells are arranged in rows and columns to form each of the arrays, and the method comprises selecting one row and a plurality of columns such that a plurality of storage cells are selected within each of the plurality of arrays. Conveniently, the method comprises selecting the same row and column addresses in each of the plurality of arrays.

Preferably, the plurality of arrays are a subset of the more than one arrays. Here, the more than one arrays are arranged in stacks, and the method comprises selecting the plurality of arrays such that each of the plurality of arrays are in different stacks. Further, the more than one arrays are arranged in layers, and the method comprises selecting the plurality of arrays such that each of the plurality of arrays are in the same layer.

Preferably, the steps of selecting the plurality of arrays and selecting one or more storage cells within each of the plurality of arrays are performed such that a whole sector unit of data, or an reciprocal integer fraction of the sector unit of data, is accessible substantially simultaneously.

Also according to the present invention there is provided a method for storing data in a magnetoresistive solid-state storage device, comprising the steps of: providing a macro-array comprising a total number of arrays of magnetoresistive storage cells, the total number of arrays being arranged in stacks of at least one layer; selecting a plurality of arrays from amongst the total number of arrays in the macro-array, the selected plurality of arrays each being in different stacks and all being in the same layer; selecting one row and one or more columns within each of the selected plurality of arrays to select a set of substantially simultaneously accessible storage cells; and accessing the set of substantially simultaneously accessible storage cells within the selected plurality of arrays, to write or read a sector unit of data, or an reciprocal integer fraction of a sector unit of data.

Either method of the invention preferably comprises error correction coding received original information to form one or more ECC encoded sector units of data to store in the device, and error correction decoding one or more ECC encoded sector units of data stored in the device to form recovered information. The or each sector unit of ECC encoded data comprises at least two independently decodeable codewords, suitably four codewords. Ideally, the ECC encoded data is formed having multi-bit symbols. Preferably, a linear encoding scheme is employed such as a Reed-Solomon code. In the preferred embodiment, the ECC encoded data uses eight-bit symbols.

The storage cells of each array can be arranged in any suitable form, but are suitably arranged in rows, and preferably in columns.

In a first preferred embodiment, at least some and preferably all bits of a multi-bit symbol are stored in a single row. That is, the n bits of each multi-bit symbol are each stored in one row of the rows of storage cells. Preferably, the n bits of a symbol are spaced at least a minimum reading distance m apart, such that all n bits are substantially simultaneously readable from the row in a single action. Advantageously, a probability that a symbol will be affected by a physical failure is substantially reduced.

In a second preferred embodiment, a multi-bit symbol is stored with one or more bits in at least two of the rows. For each multiple-bit symbol, a first set of bits are stored in a first row, and a second set of bits are stored in a second row. Ideally, at least some and preferably all columns of the first set of bits are common to at least some and preferably all columns of the second set of bits. Although it is possible for just one of the bits of the multi-bit symbol to be stored in a separate row, preferably a plurality of bits are stored in each of the at least two rows. In this embodiment, each n-bit symbol is stored across a plurality of rows r. In the most preferred example, the n bits of each symbol are stored in an arrangement of storage cells according to r×(n/r). In this embodiment, each symbol is readable by taking a slice from each of the at least two rows. Although more than one access is required to read each symbol, the probability that a symbol will be affected by physical failures is reduced even more than in the first preferred embodiment.

In a third preferred embodiment, one of the rows of storage cells stores a set of bits from at least two of the multi-bit symbols. Preferably, each set of bits is allocated to a different one of at least two blocks of ECC encoded data. In the particularly preferred embodiment each set of bits from one row is allocated to a different one of a plurality of codewords, plural codewords being associated to form a sector of ECC encoded data representing the logical unit of original information. Preferably, the sets of bits from the one row of storage cells are each allocated to symbols within a different codeword for the single sector of ECC encoded data.

This third embodiment is preferably combined with the first preferred embodiment, such that each of the sets of bits from one row comprises all of the bits from a multi-bit symbol, and the two or more multi-bit symbols taken from a single row are each allocated to different codewords of a single sector of ECC encoded data.

This third preferred embodiment can also be combined with the second preferred embodiment. Here, the plural sets of bits stored in each row each form part but not all of the multi-bit symbol. Within each row, the various sets of bits are allocated to different symbols, and those symbols in turn are allocated to different codewords. By accessing plural rows, each symbol is completed from a set of bits within each row. Preferably, for each multi-bit symbol, a first set of bits are stored in a first row, and a second set of bits are stored in a second row, such that at least some columns of the first set of bits are common to at least some columns of the second set of bits.

The third preferred embodiment is also applicable to an error correction coding scheme employing single-bit symbols. Here, at least two single-bit symbols are read from a single row of storage cells, and the at least two single-bit symbols are each allocated to a different one of at least two blocks of encoded data. Preferably, each single-bit symbol from one row is allocated to a different one of a plurality of codewords, plural codewords being associated to form a sector of ECC encoded data representing a logical unit of original information.

In each case, the third preferred embodiment minimises the adverse affect of a grouped-type failure occurring within a particular row of storage cells, because the symbols wholly or partially stored in that row are allocated to different codewords.

In a fourth preferred embodiment, plural sets of bits are stored in each row of storage cells and, similar to the third preferred embodiment, those sets of bits are allocated to at least two different units of encoded data, such as different codewords. In this fourth preferred embodiment, an order of allocation of those sets of bits amongst the different units of encoded data is changed between at least some rows. That is, a first row stores a set of bits from a symbol allocated to a first codeword, and stores a set of bits from a symbol allocated to a second codeword. A second row stores sets of bits from symbols allocated to the same codewords, but in a different order. For example, the second row stores, in order, a set of bits from a symbol allocated to the second codeword, and then a set of bits from a symbol allocated to the first codeword. Preferably, to further minimise the adverse affects of physical failures, suitably the columns of the sets of bits in the first row are shared by at least some and ideally all columns of the sets of bits in the second row. In the most preferred example of the fourth embodiment, the order of allocation of the sets of bits is rotated amongst the different codewords, for ease of management.

In a fifth preferred embodiment, the encoding step comprises forming an error check for each multi-bit symbol. Conveniently, at least one error detecting bit is provided associated with each multi-bit symbol. The error detecting bit or bits allow a parity check to be performed on the multi-bit symbol. Preferably, each multi-bit symbol and the one or more error detecting bits are stored together in the array as a symbol unit. Conveniently, each symbol unit is stored with all bits in a single row of storage cells, as in the first preferred embodiment. Alternatively, each symbol unit is stored with bits in at least two rows of storage cells, as in the second preferred embodiment. Sets of bits for each symbol unit may be allocated as in the third or fourth embodiments.

According to a second aspect of the present invention there is provided a magnetoresistive solid-state storage device, comprising: a macro-array comprising more than one array of magnetoresistive storage cells; and a controller arranged to substantially simultaneously access a selected set of the storage cells by selecting a plurality of the arrays, and by selecting storage cells within each of the plurality of arrays.

Preferably, the controller is arranged to store a sector unit of data or an reciprocal integer fraction of a sector unit of data substantially simultaneously using the selected set of storage cells.

Preferably, the device comprises an error correction coding and decoding unit arranged to transform original information into at least one sector unit of ECC encoded data, or vice versa.

The device is preferably adapted to operate according to any of the methods and embodiments described herein. For fast access times and to reduce exposure to physical failures, each unit of data (e.g. a sector) is stored with a few sub-units (e.g. bytes) in each of a large plurality of the arrays.

Advantageously, the plurality of arrays are accessible in parallel substantially simultaneously, and a failure in any one array affects only a small portion of the data unit.

For a better understanding of the invention, and to show how embodiments of the same may be carried into effect, reference will now be made, by way of example, to the accompanying diagrammatic drawings in which.

Figure 1:
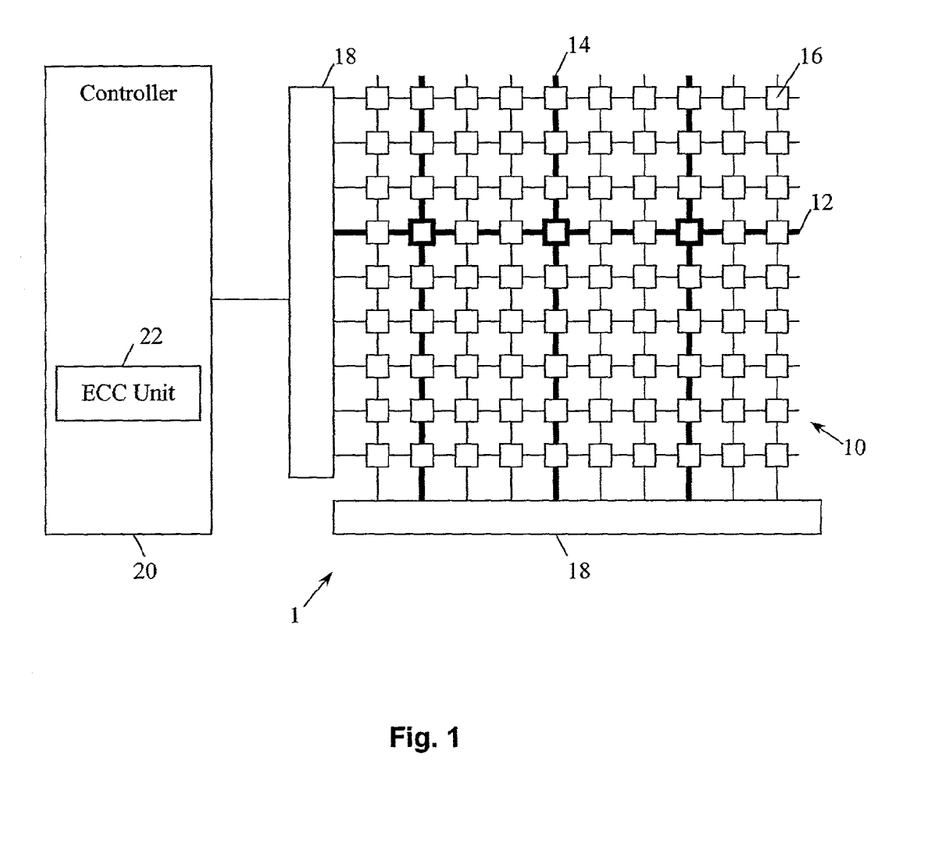
FIG. 1 is a schematic diagram showing a preferred MRAM device including an array of storage cells.

FIG. 1 shows a simplified magnetoresistive solid-state storage device 1 comprising an array 10 of storage cells 16. The array 10 is coupled to a controller 20 which, amongst other control elements, includes an ECC coding and decoding unit 22. The controller 20 and the array 10 can be formed together on a single substrate, or can be arranged separately.

In the preferred embodiment, the array 10 comprises of the order of 1024 by 1024 storage cells, just a few of which are illustrated. The storage cells 16 are each formed at an intersection between control lines 12 and 14. In this example control lines 12 are arranged in rows, and control lines 14 are arranged in columns. The control lines 12 and 14 are generally orthogonal, but other more complicated lattice structures are also possible. Suitably, the row and column lines 12,14 are coupled to control circuits 18, which include a plurality of read/write control circuits. Depending upon the implementation, one read/write control circuit is provided per column, or read/write control circuits are multiplexed or shared between columns. In a device access such as a write operation or a read operation, one row 12 and one or more columns 14 are selected by the control circuits 18 to access the required storage cell or cells 16 (or conversely one column and several rows, depending upon the orientation of the array). The selected cells 16, the selected row line 12, and the selected column lines 14, are each represented by thicker lines in FIG. 1. The preferred MRAM device requires a minimum distance m, such as sixty-four cells, between the selected column lines 14 to minimise cross-cell interference. Given that each array 10 has rows of length l, such as 1024 storage cells, it is possible to access substantially simultaneously up to l/m=1024/64=16 uniquely addressable cells from the array 10.

Each storage cell 16 stores one bit of data suitably representing a numerical value and preferably a binary value, i.e. one or zero. Suitably, each storage cell includes two films which assume one of two stable magnetisation orientations, known as parallel and anti-parallel. The magnetisation orientation affects the resistance of the storage cell. When the storage cell 16 is in the anti-parallel state, the resistance is at its highest, and when the magnetic storage cell is in the parallel state, the resistance is at its lowest. Suitably, the high resistance anti-parallel state defines a "0" logic state, and the low resistance parallel state defines a "1" logic state, or vice versa. In the preferred device, the resistance of each storage cell 16 is determined according to a phenomenon known as spin tunnelling and the cells are referred to as magnetic tunnel junction storage cells. The condition of the storage cell is determined by measuring the sense current (proportional to resistance) or a related parameter such as response time to discharge a known capacitance, which gives one or more parametric values for each storage cells. A logical value can then be derived from the obtained parametric value or values. Depending upon the nature and construction of the MRAM device, the read operation may comprise multiple steps or require combined read and rewrite actions.

Figure 2:
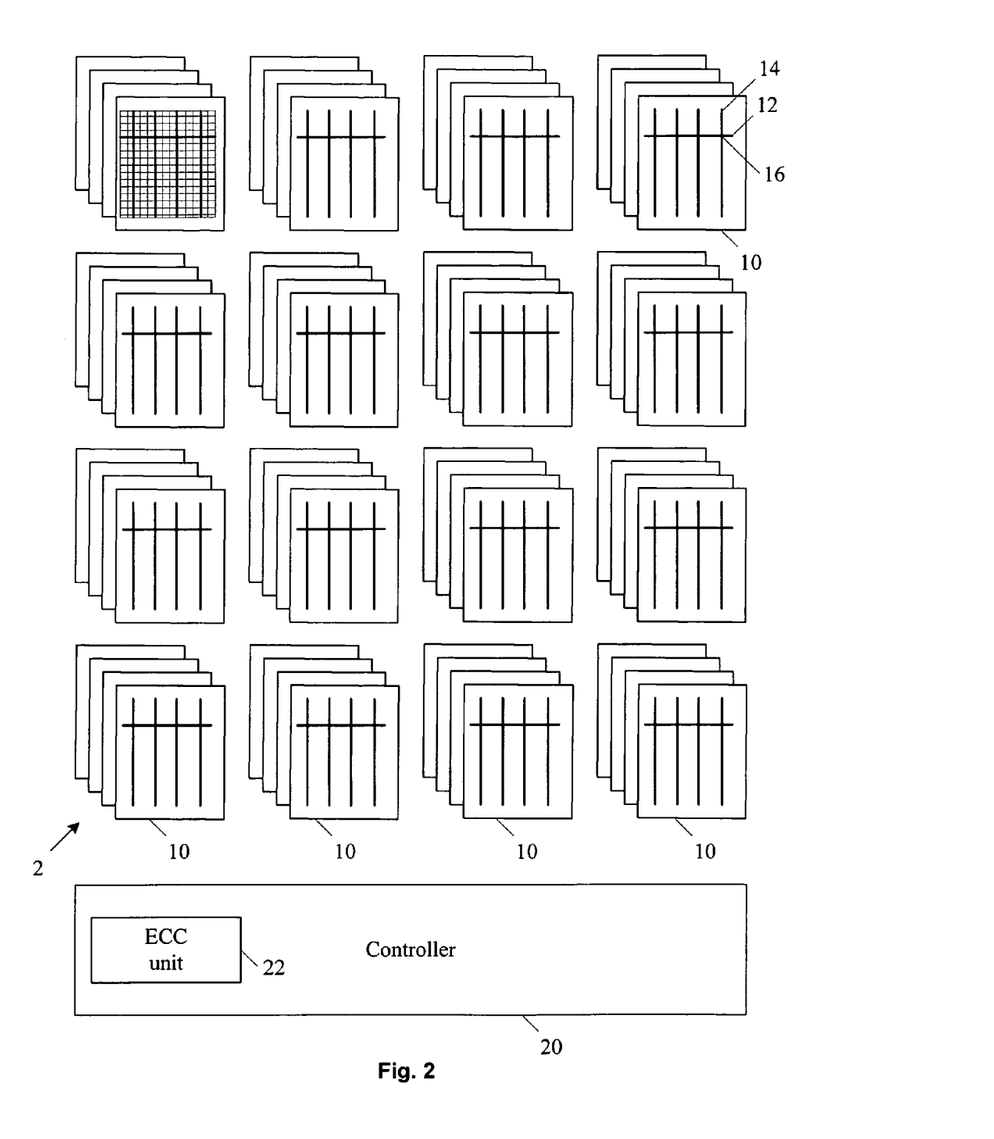
FIG. 2 shows a preferred MRAM device in more detail.

FIG. 2 shows the preferred MRAM device in more detail. A macro-array 2 is formed comprising a large plurality of individual arrays 10, each of which is formed as discussed above for FIG. 1. The use of plural arrays advantageously allows an MRAM device to be obtained of a desired overall data storage capacity, without the individual arrays 10 in themselves becoming so large that they are difficult to manufacture or control. For simplicity, FIG. 2 shows only a portion of the macro-array.

Many design choices are available to the skilled person when laying out the arrays 10 on a suitable substrate during manufacture of the device, but, amongst other concerns, it is commonly desired to reduce substrate area for each device. Conveniently, it has been found that the arrays 10 can be manufactured in layers. In the example of FIG. 2, four arrays 10 are layered to form a stack. In an example practical device having a storage capacity of the order of 128 Mbytes, 1024 arrays are arranged in a macro-array of 16 arrays wide, by 16 arrays high, with four stack layers. The size of the macro-array is variable as desired, and the MRAM device optionally comprises more than one such macro-array.

A data storage arrangement and device access method will now be described which allow full use to be made of the potential advantages of MRAM devices, particularly in terms of the very fast access response times of the storage cells for write and read operations.

A unit of data such as a sector (e.g. 512 8-bit bytes) is stored in the MRAM device 1 using a set of cells. It would be possible to store all of the sector unit in a single array 10. However, in order to increase device access speed, the set of cells selected to store the sector unit of data are allocated across a plurality of arrays 10.

As illustrated in FIG. 2, the preferred method for accessing the MRAM device 1 comprises selecting one row in each of a plurality of arrays 10, and selecting plural columns from each array intersecting with the one row to access a plurality of storage cells in the one row of each of the plurality of arrays. The accessed cells within each of the plurality of arrays correspond to a small portion of the unit of data. Together, the accessed cells provide a whole unit of data, such as a whole sector unit, or at least a substantial portion of the unit. Advantageously, each of the plurality of arrays are accessible substantially simultaneously. Therefore, device access speed for a read operation or a write operation is increased. This device access is conveniently termed a slice through the macro-array.

As shown in FIG. 2, it is convenient for the same row address and the same column addresses to be selected in each of the plurality of arrays. That is, a unit of data is stored across a plurality of arrays, using the same row and column addresses within each of the plurality of arrays.

As also shown in FIG. 2, in the preferred construction the arrays 10 are layered to form stacks. Only one array within each stack can be accessed at any one time. Therefore, it is convenient that the plurality of arrays used to store a sector unit of data are each in different stacks (i.e. none of the selected plurality of arrays are in the same stack). Also, it is convenient to select arrays which are all in the same layer. Ideally, one array is selected from each stack, the arrays each being in the same layer within each stack. In the example of FIG. 2, the topmost array within each stack has been selected.

Most conveniently, the number of arrays available in the macro-array 2 is matched to the size of a sector unit of data to be stored in the device. Here, it is convenient to provide the total number of arrays such that, given the number of cells which can be substantially simultaneously accessed in an array, a sector unit is stored using cells within all of the arrays of a single layer of the device, to store a whole sector unit of data. In other preferred embodiments, which will be described in more detail below, it is convenient for an reciprocal integer fraction of a sector unit of data (e.g. one half or one third or one quarter of a sector unit) to be accessible substantially simultaneously.

So far, the description of the preferred embodiment assumes that the stored data is perfect, and that no failures occur which affect the data stored in the device. However, although generally reliable, it has been found that failures can occur which affect the ability of an MRAM device to store data reliably in the storage cells 16. Physical failures within an MRAM device can result from many causes including manufacturing imperfections, internal effects such as noise in a read process, environmental effects such as temperature and surrounding electromagnetic noise, or ageing of the device in use. Hence, the preferred data storage arrangements and device access methods aim to minimise the impact of failures upon the integrity of data stored in the device.

Advantageously, in the preferred embodiment discussed above with reference to FIG. 2, each unit of data is stored across many arrays, and the adverse impact on that unit of data due to a failure in any one array is minimised.

In general, failures can be classified as either systematic failures or random failures. Systematic failures consistently affect a particular storage cell or a particular group of storage cells. Random failures occur transiently and are not consistently repeatable. Typically, systematic failures arise as a result of manufacturing imperfections and ageing, whilst random failures occur in response to internal effects and to external environmental affects.

Failures are highly undesirable and mean that at least some storage cells in the device cannot be written to or read from reliably. A cell affected by a failure can become unreadable, in which case no logical value can be read from the cell, or can become unreliable, in which case the logical value read from the cell is not necessarily the same as the value written to the cell (e.g. a "1" is written but a "0" is read). The storage capacity and reliability of the device can be severely affected and in the worst case the entire device becomes unusable.

Failure mechanisms take many forms, and the following examples are amongst those identified:

1. Shorted bits—where the resistance of the storage cell is much lower than expected. Shorted bits tend to affect all storage cells lying in the same row and the same column.
2. Open bits—where the resistance of the storage cell is much higher than expected. Open bit failures can, but do not always, affect all storage cells lying in the same row or column, or both.
3. Half-select bits—where writing to a storage cell in a particular row or column causes another storage cell in the same row or column to change state. A cell which is vulnerable to half select will therefore possibly change state in response to a write access to any storage cell in the same row or column, resulting in unreliable stored data.
4. Single failed bits—where a particular storage cell fails (e.g. is stuck always as a "0"), but does not affect other storage cells and is not affected by activity in other storage cells.

These four example failure mechanisms are each systematic, in that the same storage cell or cells are consistently affected. Where the failure mechanism affects only one cell, this can be termed an isolated failure. Where the failure mechanism affects a group of cells, this can be termed a grouped failure.

A physical failure, and in particular a grouped failure affecting many cells, can affect many bytes and possibly many sectors of stored data. One response would be to make redundant areas of the device which are affected by failures. However, it has been found that keeping information about logical units such as bytes affected by physical failures is not efficient, due to the quantity of data involved. That is, attempts to produce a list of all such logical units rendered unusable due to at least one physical failure, tend to generate a quantity of management data which is too large to handle efficiently. Further, depending on how the data is organised on the device, a single physical failure can potentially affect a large number of logical data units, such that avoiding use of all bytes, sectors or other units affected by a failure substantially reduces the storage capacity of the device. For example, a grouped failure such as a shorted bit failure in just one storage cell affects many other storage cells, which lie in the same row or the same column. Thus, a single shorted bit failure can affect 1023 other cells lying in the same row, and 1023 cells lying in the same column—a total of 2027 affected cells. These 2027 affected cells may form part of many bytes, and many sectors, each of which would be rendered unusable by the single grouped failure.

Some improvements have been made in manufacturing processes and device construction to reduce the number of manufacturing failures, but this usually involves increased manufacturing costs and complexity, and reduced device yields. Hence, a problem has been identified in that it is desired to store data on an MRAM device in a manner which minimises the adverse affects of physical failures. In particular, it is desired to minimise the adverse affects of grouped failures such as shorted-bit failures.

The MRAM devices of the preferred embodiments of the present invention employ error correction coding to provide a device which is error tolerant, preferably to tolerate and recover from both random failures and systematic failures. Typically, error correction coding involves receiving original information which it is desired to store and forming encoded data which allows errors to be identified and ideally corrected. The encoded data is stored in the solid-state storage device. At read time, the original information is recovered by error correction decoding the encoded stored data. A wide range of error correction coding (ECC) schemes are available and can be employed alone or in combination. Suitable ECC schemes include both schemes with single-bit symbols (e.g. BCH) and schemes with multiple-bit symbols (e.g. Reed-Solomon).

As general background information concerning error correction coding, reference is made to the following publication: W. W. Peterson and E. J. Weldon, Jr., "Error-Correcting Codes", $2^{nd}$ edition, $12^{th}$ printing, 1994, MIT Press, Cambridge Mass.

A more specific reference concerning Reed-Solomon codes used in the preferred embodiments of the present invention is: "Reed-Solomon Codes and their Applications", ED. S. B. Wicker and V. K. Bhargava, IEEE Press, New York, 1994.

Figure 3:
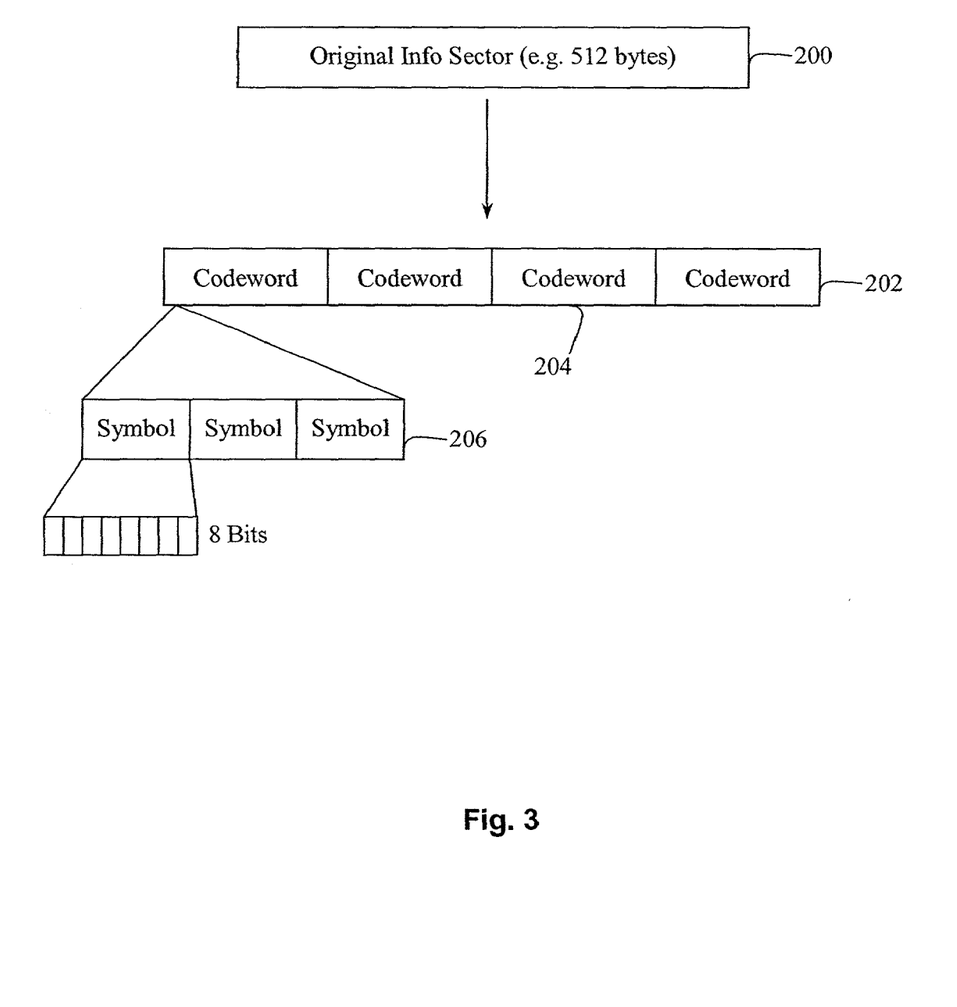
FIG. 3 shows a preferred logical data structure.

FIG. 3 shows an example logical data structure used when storing data in the MRAM device 10. Original information 200 is received in predetermined units such as a sector comprising 512 bytes. Error correction coding is performed to produce ECC encoded data, in this case an encoded sector 202. The encoded sector 202 comprises a plurality of symbols 206 which can be a single bit (e.g. a BCH code with single-bit symbols) or can comprise multiple bits (e.g. a Reed-Solomon code using multi-bit symbols). In the preferred Reed-Solomon encoding scheme, each symbol 206 conveniently comprises eight bits and, as shown in FIG. 3, each encoded sector 202 comprises four codewords 204, each comprising of the order of 144 to 160 symbols. The eight bits corresponding to each symbol are conveniently stored in eight storage cells 16, which can be termed a symbol group. A physical failure which directly or indirectly affects any of these eight storage cells in a symbol group can result in one or more of the bits being unreliable (i.e. the wrong value is read) or unreadable (i.e. no value can be obtained), giving a failed symbol.

In the current MRAM devices, grouped failures tend to affect a large group of storage cells, sharing the same row or column. This provides an environment which is unlike prior storage devices. The preferred embodiments of the present invention employ an ECC scheme with multi-bit symbols. Where manufacturing processes and device design change over time, it may become more appropriate to organise storage locations expecting bit-based errors and then apply an ECC scheme using single-bit symbols, and at least some of the following embodiments can be applied to single-bit symbols.

Error correction decoding each block of stored ECC encoded data allows failed symbols 206 to be identified and corrected. Conveniently, decoding is performed independently for each block of ECC encoded data, such as an ECC encoded sector 202 or, in the preferred embodiment, for each codeword 204. Hence, the encoded sector 202, or preferably each ECC codeword 204, forms the unit of data to be stored in the device, as discussed above with reference to FIG. 2.

The preferred Reed-Solomon scheme is an example of a linear error correcting code, which mathematically identifies and corrects completely up to a predetermined maximum number of failed symbols 206 within each independently decodeable block of ECC encoded data, depending upon the power of the code. For example, a [160,128,33] Reed-Solomon code producing codewords having one hundred and sixty 8-bit symbols corresponding to one hundred and twenty-eight original information bytes and a minimum distance of thirty-three symbols can locate and correct up to sixteen symbol errors.

Suitably, the ECC scheme employed is selected with a power sufficient to recover original information 200 from the encoded data in substantially all cases. Pictorially, each perfect block of ECC encoded data represents a point in space, and a reliably correctable form of that block of ECC encoded data lies within a "ball" having a radius corresponding to the maximum power of the ECC encoding scheme. Very rarely, a block of encoded data is encountered which is affected by so many failures that the original information 200 is unrecoverable. Here, the ECC decoding unit 22 is presented with a block of ECC encoded data which is so severely affected by physical failures that it lies outside the ball of all reliably correctably blocks of ECC encoded data. Also, even more rarely, the failures result in a mis-correct, where information recovered from the encoded data 202 is not equivalent to the original information 200. Even though the recovered information does not correspond to the original information, a mis-correct is not readily determined. Pictorially, the ECC decoding unit 22 is presented with a block of ECC encoded data which is so severely affected by physical failures that it lies inside an incorrect ball, i.e. not the ball corresponding to the perfect form of that block of ECC encoded data. Ideally, the ECC scheme is selected such that the probability of encountering an unrecoverable or mis-corrected block of ECC encoded data is extremely small, suitably of the order of $10^{-15}$ to $10^{-20}$.

Further preferred embodiments of the invention will now be described, each of which are employed in conjunction with the data storage arrangement discussed above with reference to FIG. 2, and are used to store ECC encoded data formed as just discussed with reference to FIG. 3.

Figure 4:
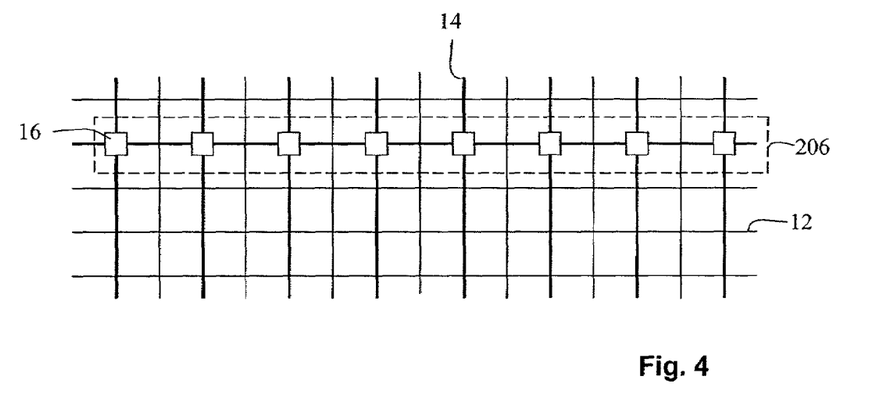
FIG. 4 shows a first preferred arrangement for storing data in the MRAM device of FIG. 1.

FIG. 4 shows a first preferred arrangement for storing data in the MRAM device 1 of FIG. 1. A plurality of bits and preferably all bits from a particular multi-bit symbol 206 are stored in the same row 12 of the array 10. This gives a preferred 1×n arrangement, where n is the number of bits in each symbol.

The 1×n arrangement of FIG. 4 significantly reduces the probability that a symbol will be affected by a physical failure. Assuming the error probability of a particular grouped failure in a storage cell 16 to be a small quantity p, then if each cell of an eight-bit symbol lies in a different row and in a different column (i.e. the cells are distributed widely over the array), the symbol error probability is approximately (8+8)1024 p=16384 p. However, the storage arrangement of FIG. 4 substantially reduces the error probability to approximately (8+1)1024 p=9216 p, which corresponds to an improvement of approximately 44%.

In the 1×n arrangement of FIG. 4, a grouped failure of any of the storage cells 16 may affect all of the bits within a particular symbol. Other symbols of this block of encoded data are stored in other rows, such that they are not affected by a grouped failure in this row. In particular, data is stored such that a physical failure is likely to cause a burst error in a symbol or a small group of symbols of a particular logical block of encoded data such as a codeword 204, whilst generally not affecting other symbols in that block.

As shown in FIG. 2, symbols from a block of encoded data are distributed across plural arrays 10. Advantageously the effect on the block is minimised, should a grouped failure occur in any one of those plural arrays, because at most only a few symbols within that block can be affected by that grouped failure. Ideally, the other symbols are stored on other arrays, and so are isolated from the effects of that failure.

In one example, each sector of original data 200 comprises of the order of 512 8-bit bytes. Depending upon the nature and power of the ECC scheme, each sector of encoded data 202 requires of the order of 576 to 640 8-bit symbols 206, suitably arranged as four codewords 204 each of 144 to 160 symbols. Hence, storing each encoded sector requires 4608 or respectively 5120 single-bit storage cells.

A single slice of the macro-array allows simultaneous access to, for example, sixteen bits representing the two stored 8-bit symbols 206 from each of the arrays 10, and in this example a slice from each of the 288 or 320 arrays in one layer of a preferred 16×18×4 or 16×20×4 macro-array yields the encoded sector 202. Advantageously, the preferred 1×n symbol arrangement of FIG. 4 allows a complete encoded sector to be written to or read from the macro-array substantially simultaneously in a single slice. By accessing plural arrays in parallel, response times from the MRAM device are improved.

Figure 5:
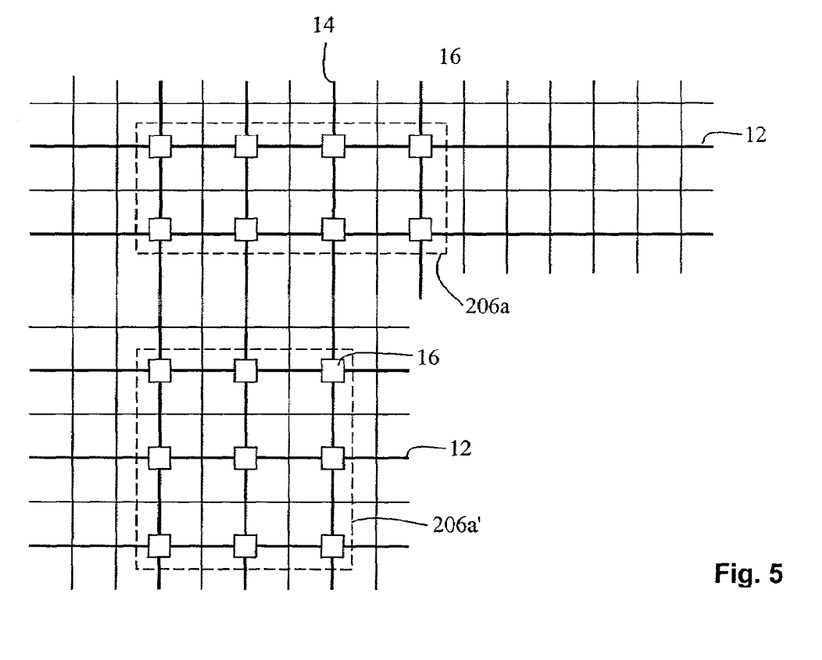
FIG. 5 shows a second preferred data storage arrangement.

FIG. 5 shows a second preferred data storage arrangement. Each multi-bit symbol 206 is arranged such that at least some bits share the same row 12, and at least some bits share the same column 14. In a first example, symbol 206a comprises eight bits, four of which lie in a first row and four of which lie in a second row. The columns are shared between the sets of bits in the two rows, such that the columns appropriate to the set of four bits in first row are used again for the set of four bits of the second row. In a second example, symbol 206a' comprises nine bits arranged in three rows and three columns, again such that the accessed columns of the first row are common to the second and third rows.

The data storage arrangement of FIG. 5 can be applied to a logical unit of data of any desired size. Where a symbol of n-bits is stored in r rows, the preferred arrangement is r×(n/r). For example, a 16-bit symbol is preferably stored as a 1×16 layout, or more preferably as a 2×8 or 4×4 layout to minimise the adverse affect of grouped failures on that symbol. This preferred arrangement distributes an equal number of bits in each row, but an unequal number is also possible.

Advantageously, the storage arrangement of FIG. 5 further reduces the probability that a symbol will be affected by a physical failure. Following on from the example given above, the symbol error probability for a 2×4 arrangement is approximately (4+2)1024 p=6144 p. This is an improvement of some 33% over the arrangement of FIG. 4, and an improvement of some 62% over a baseline arrangement where each bit has a separate row and column.

The arrangement of FIG. 5 has a slight disadvantage in that multiple access operations are required in order to write or read bit values for the whole symbol 206. A 2×4 arrangement requires two slices, whilst a 3×3 arrangement requires three slices. However, with currently available MRAM devices, the reduced risk of symbol failures significantly outweighs the cost of the additional access operations.

Figure 6:
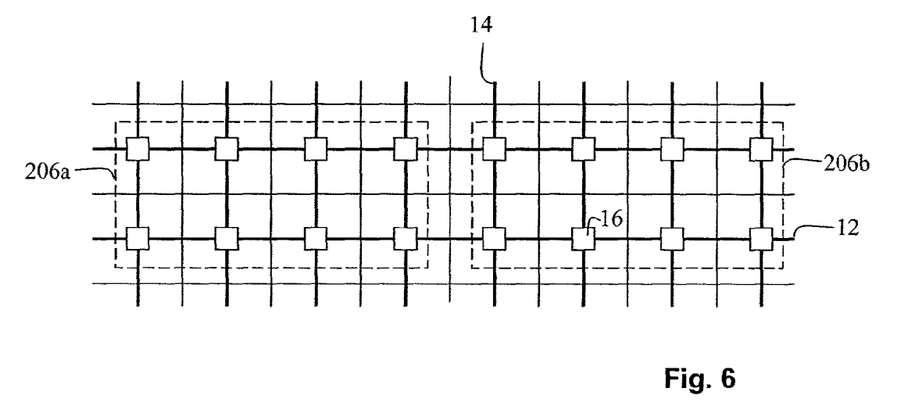
FIG. 6 shows a third preferred data storage arrangement.

FIG. 6 shows another preferred arrangement for storing data in the MRAM device 1 of FIG. 1. FIG. 6 shows two eight-bit symbols 206a and 206b each in a 2×4 arrangement as discussed with reference to FIG. 5. In each preferred array 10, having of the order of 1024 rows and 1024 columns, sixteen bits are taken from a first row in a first slice, which in this example results in four bits of the first symbol 206a and four bits of the second symbol 206b, along with four bits of two other symbols which are not shown, ie. four sets of four bits each from different symbols. A second slice from a second row likewise provides four bits to each of four symbols, to complete the four preferred eight-bit symbols. Alternatively, using the 1×n storage arrangement shown in FIG. 4, a single slice provides two eight-bit symbols. Whichever layout is preferred for each symbol, a common feature is that each slice provides a set of bits taken from at least two symbols 206a and 206b. Preferably, these symbols 206a and 206b are allocated to at least two separate units of encoded data such as two codewords 204. That is, the first symbol 206a is allocated to a first codeword 204, whilst the adjacent second symbol 206b is allocated to a second codeword 204. These two codewords suitably form part of the same block of encoded data 202, from which a complete original information sector 200 can be recovered.

Advantageously, a grouped failure affecting a particular row 12 affects symbols 206a and 206b in different codewords 204. The data storage arrangement of FIG. 6 minimises the effect of a grouped failure in any particular codeword. Since the preferred error correction coding is limited by its power to correcting a particular number of symbols within each codeword, advantageously the storage arrangement of FIG. 6 allows efficient use of the ECC decoding scheme within each codeword.

Figure 7:
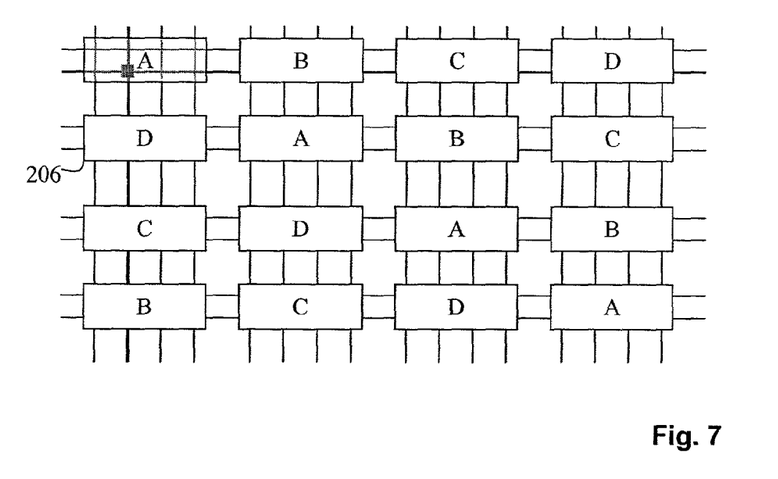
FIG. 7 shows a fourth preferred data storage arrangement.

FIG. 7 shows another preferred method for storing data in the MRAM device 1 of FIG. 1. In at least some preferred embodiments of the present invention it is desired to store a significant proportion of a particular block of encoded data, such as an encoded codeword 204, in a single array 10. One example is a quarter-size macro-array, wherein the macro-array has a 8×10×4 layout instead of a full-size 16×20×4 layout. Even in this situation it is desired to maximise device read and write access speed, whilst minimising exposure to physical failures.

FIG. 7 shows part of an array 10 with symbols 206 allocated to four codewords A, B, C, D which together form an encoded sector 202. A similar storage arrangement suitably occurs in each of some or all other arrays of the macro-array, to provide a complete encoded sector in relatively few slices. Each symbol is stored in a 2×4 arrangement, as discussed above with reference to FIG. 5, which allows a complete encoded sector to be accessed in as little as four or eight slices. For convenient access to the array, some or all columns are shared in subsequent rows, and ideally the data is stored in consecutive rows.

In FIG. 7, the four sets of bits obtained from each slice are each allocated to symbols within the four different codewords A, B, C, D, which is similar to the embodiment as discussed above with reference to FIG. 6. Further, in FIG. 7, allocation of the symbols from each pair of slices changes amongst the four codewords A, B, C, D, between at least some of the rows. That is, sets of bits from a first set of rows (here the first pair) are allocated to codewords A, B, C, D in order, whilst sets of bits from a second set of rows are allocated to codewords D, A, B, C, in order. Any suitable redistribution may be employed, but preferably the order is rotated between each set of rows for simple management.

Advantageously, the impact of any single grouped failure on a particular codeword is minimised, which increases the probability of recovering the original data 200 from the encoded stored data 202. In FIG. 7, a grouped failure is shown affecting the row and column at lines 12, 14 in bold. The grouped failure affects one symbol from codeword A, and two symbols in each of codewords B, C and D. By contrast, if all of the affected symbols were from a single codeword, then that codeword would suffer seven (as opposed to only one or two) failed symbols. Therefore, the effect of this grouped failure on each codeword 204 is substantially reduced, due to changing the order of the symbols amongst the codewords. As a result, a lower-powered ECC coding scheme can be employed and/or a great number of failures can be tolerated for the same ECC overhead.

Figure 8:
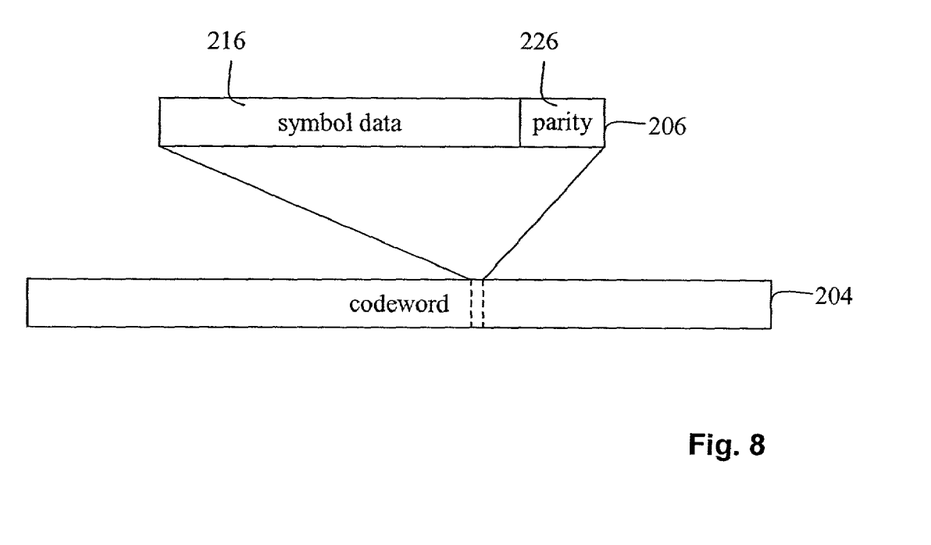
FIG. 8 shows a fifth preferred data storage arrangement.

FIG. 8 shows another preferred data storage arrangement, wherein at least two levels of error correction coding are employed. At a first level, the original data is encoded such as by using a linear error correction coding scheme to form symbol-based encoded data 204. Each symbol is then associated with a second level of error detection coding, or even error correction coding. In this example each symbol 206 is associated with a single parity bit 226 that allows a parity check to be performed on the eight-bit symbol. Each symbol unit 206 therefore comprises nine bits, including the error checking parity bit, which are conveniently stored together, such as in a 1×9 arrangement or preferably a 3×3 arrangement as shown in symbol 206a' in FIG. 5. The preferred single parity bit allows an odd number of bit errors in a multiple-bit symbol to be identified. Advantageously, identifying the zero or more symbols in a block of ECC encoded data which are subject to such errors improves the ability of the ECC decoder 22 to perform error correction decoding.

The MRAM device described herein is ideally suited for use in place of any prior solid-state storage device. In particular, the MRAM device is ideally suited both for use as a short-term storage device (e.g. cache memory) or as a longer-term storage device (e.g. a solid-state hard disk). An MRAM device can be employed for both short term and longer term storage within a single apparatus, such as a computing platform.

A magnetoresistive solid-state storage device and methods for storing data in such a device have been described. The preferred embodiments of the present invention improve device access speed and minimise the risk of data loss due to failures. Advantageously, the storage device is able to tolerate a relatively large number of physical failures, including both systematic failures and random failures, whilst successfully remaining in operation with no loss of original data. Simpler and lower cost manufacturing techniques can be employed and/or device yield and device density can be increased for the same or reduced ECC overhead.

The invention claimed is:

1. A method for storing data in a magnetoresistive solid-state storage device having magnetoresistive storage cells arranged in more than one array, comprising:
    selecting a plurality of arrays from amongst the more than one arrays;
    selecting a plurality of storage cells within each of the plurality of arrays such that the selected cells have a predetermined minimum number of greater than zero of non-selected cells between them; and
    accessing substantially simultaneously the selected cells within the selected plurality of arrays.

2. The method of claim 1, wherein the magnetoresistive storage cells are arranged in rows and columns to form each of the arrays, and the method comprises selecting one row and a plurality of columns such that a plurality of storage cells are selected within each of the plurality of arrays.

3. The method of claim 2, comprising selecting the same row and column addresses in each of the plurality of arrays.

4. The method of claim 1, wherein the plurality of arrays are a subset of the more than one arrays.

5. The method of claim 1, wherein the more than one arrays are arranged in stacks, and the method comprises selecting the plurality of arrays such that each of the plurality of arrays are in different stacks.

6. The method of claim 1, wherein the more than one arrays are arranged in layers, and the method comprises selecting the plurality of arrays such that each of the plurality of arrays are in the same layer.

7. The method of claim 1, wherein selecting the plurality of arrays and selecting one or more storage cells within each of the plurality of arrays are performed such that a whole sector unit of data, or an reciprocal integer fraction of the sector unit of data, is accessible substantially simultaneously.

8. The method of claim 1, further comprising error correction coding received original information to form one or more ECC encoded sector units of data to store in the device, and error correction decoding one or more ECC encoded sector units of data stored in the device to form recovered information.

9. The method of claim 8, wherein the or each sector unit of ECC encoded data comprises at least two independently decodeable codewords.

10. A method for storing data in a magnetoresistive solid-state storage device, comprising:
    providing a macro-array comprising a total number of arrays of magnetoresistive storage cells, the total number of arrays being arranged in stacks of at least one layer;
    selecting a plurality of arrays from amongst the total number of arrays in the macro-array, the selected plurality of arrays each being in different stacks and all being in the same layer;
    selecting one row and one or more columns within each of the selected plurality of arrays to select a set of substantially simultaneously accessible storage cells such that the selected cells have a predetermined minimum number of greater than zero of non-selected cells between them; and
    accessing the set of substantially simultaneously accessible storage cells within the selected plurality of arrays, to write or read a sector unit of data, or an reciprocal integer fraction of a sector unit of data.

11. A magnetoresistive solid-state storage device, comprising:
    a macro-array comprising more than one array of magnetoresistive storage cells; and
    a controller arranged to substantially simultaneously access a selected set of the storage cells by selecting a plurality of the arrays, and selecting storage cells within each of the plurality of arrays such that the selected cells have a predetermined minimum number of greater than zero of non-selected cells between them.

12. The device of claim 11, wherein the controller is arranged to store a sector unit of data or an reciprocal integer fraction of a sector unit of data substantially simultaneously using the selected set of storage cells.

13. The device of claim 11, comprising an error correction coding and decoding unit arranged to transform original information into at least one sector unit of ECC encoded data, or vice versa.

* * * * *